US007815167B2

(12) United States Patent
Colli et al.

(10) Patent No.: US 7,815,167 B2
(45) Date of Patent: Oct. 19, 2010

(54) VALVE FOR ADJUSTING THE AIR FLOW RATE IN AN INTERNAL COMBUSTION ENGINE

(75) Inventors: Marcello Colli, Reggio Emilia (IT); Nazario Bellato, Bologna (IT); Stefano Musolesi, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 465 days.

(21) Appl. No.: 12/042,393

(22) Filed: Mar. 5, 2008

(65) Prior Publication Data

US 2008/0217566 A1 Sep. 11, 2008

(30) Foreign Application Priority Data

Mar. 9, 2007 (EP) ................................. 07425137

(51) Int. Cl.
*F16K 51/00* (2006.01)

(52) U.S. Cl. .................. 251/148; 251/129.11; 251/305; 123/337; 285/412

(58) Field of Classification Search ............ 251/129.11, 251/148, 151, 305; 123/337; 285/408, 412
See application file for complete search history.

(56) References Cited

U.S. PATENT DOCUMENTS

| | | | | |
|---|---|---|---|---|
| 5,711,271 | A | 1/1998 | Schlagmueller et al. | |
| 6,119,652 | A * | 9/2000 | Waples et al. | 123/337 |
| 6,302,452 | B1 * | 10/2001 | Schlicht | 285/363 |
| 6,595,185 | B2 * | 7/2003 | Michels | 123/337 |
| 7,669,572 | B2 * | 3/2010 | Jury et al. | 123/184.56 |
| 7,735,475 | B2 * | 6/2010 | Farrell et al. | 123/470 |
| 2006/0005809 | A1 | 1/2006 | Kado et al. | |

FOREIGN PATENT DOCUMENTS

| | | |
|---|---|---|
| DE | 44 43 502 | 6/1996 |

* cited by examiner

*Primary Examiner*—John K Fristoe, Jr.
(74) *Attorney, Agent, or Firm*—Gottlieb, Rackman & Reisman

(57) ABSTRACT

A valve for adjusting the air flow rate in an internal combustion engine; the valve presents: a valve body; a cylindrical tubular pipe obtained within the valve body and in which an air introduction channel is defined; a valve seat obtained along the air introduction channel of the tubular pipe; an actuation system; a shutter, mobile under the bias of the actuation system; and a connection flange, which is integral with a first end of the tubular pipe and presents a plurality of through holes which are crossed in use by corresponding fastening screws for rigidly fixing the valve body; the connection flange is provided with a lower plate and an upper plate, which are reciprocally parallel, facing and distanced and are arranged radially with respect to the cylindrical tubular pipe, and a number of ribs, which reciprocally connect the plates, are arranged perpendicularly to the plates, and are arranged axially with respect to the cylindrical tubular pipe.

12 Claims, 5 Drawing Sheets

VALVE FOR ADJUSTING THE AIR FLOW RATE IN AN INTERNAL COMBUSTION ENGINE

TECHNICAL FIELD

The present invention relates to a valve for adjusting the air flow rate in an internal combustion engine.

The present invention is advantageously applied to a butterfly valve for adjusting the air flow rate upstream of an intake manifold of an internal combustion engine.

BACKGROUND ART

In petrol-fed internal combustion engines, there is contemplated a butterfly valve which is arranged upstream of an intake manifold and adjusts the flow rate of the air which is fed to the cylinders. A known butterfly valve presents a valve body accommodating a valve seat engaged by a butterfly valve plate, which is keyed onto a rotational shaft to turn between an opening position and a closing position by effect of the action of an electrical motor coupled to the shaft itself by means of a geared drive.

A position sensor, which is adapted to detect the angular position of the shaft (i.e. of the butterfly valve plate), is coupled to one end of the shaft to allow a control unit to feedback-control the electrical motor. The electrical motor, the geared drive and the position sensor are accommodated within a valve body accommodation chamber, which accommodation chamber is closed by a removable lid.

In the valve body, there is a cylindrical tubular pipe, within which there is obtained an air introduction channel along which the valve seat is defined and the butterfly valve plate is thus arranged. A connection flange, which presents four holes which are crossed in use by corresponding fastening screws to rigidly fasten the valve body to the intake manifold, is provided on a first end of the cylindrical tubular pipe; instead, a flexible tube, which receives fresh air (i.e. air from the atmosphere) from an air vent provided with air cleaner and is fixed about the second end of the cylindrical tubular pipe by means of a tube clamp, is fitted about the second end of the cylindrical tubular pipe opposite to the first end.

It has recently been proposed to form the valve body by moulded plastic material instead of metallic material to reduce the manufacturing costs of the valve body itself. When the valve body is formed by moulded plastic material, the connection flange of the cylindrical tubular pipe is provided with four cylindrical reinforcement columns, each of which perpendicularly rises from the connection flange and is centrally perforated to accommodate a corresponding fastening screw. The function of these reinforcement columns is to locally increase the mechanical strength at the fastening screws and the presence of the reinforcement columns themselves is made necessary by the fact that the plastic material presents lower mechanical features with respect to the previously used metallic material.

In order to obtain an appropriate mechanical strength, each reinforcement column must be connected on top to the cylindrical tubular pipe of the valve body. However, it has been observed that at the connection point with the reinforcement columns, the cylindrical tubular pipe tends to presents deformations related to the phenomenon of “shrinkage” of the plastic material during the step of moulding. Such deformations of the cylindrical tubular pipe are particularly detrimental, because they alter the geometry of the air introduction channel in an area very close to (or even coinciding with) the valve seat concerned by the butterfly valve plate and thus determine an alteration of the butterfly valve performances.

In order to eliminate the presence of the reinforcements columns, it has been suggested to make a very thick connection flange (at least 15 mm); however, such constructive solution implies both a use of more material (and thus a higher cost and a heavier weight), and greater complications in the step of moulding of the valve body.

DISCLOSURE OF INVENTION

It is the object of the present invention to provide a valve for adjusting the air flow rate in an internal combustion engine, which valve is free from the above-described drawbacks and, specifically, is easy and cost-effective to implement.

According to the present invention, there is provided a valve for adjusting the air flow rate in an internal combustion engine as claimed in the attached Claims

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
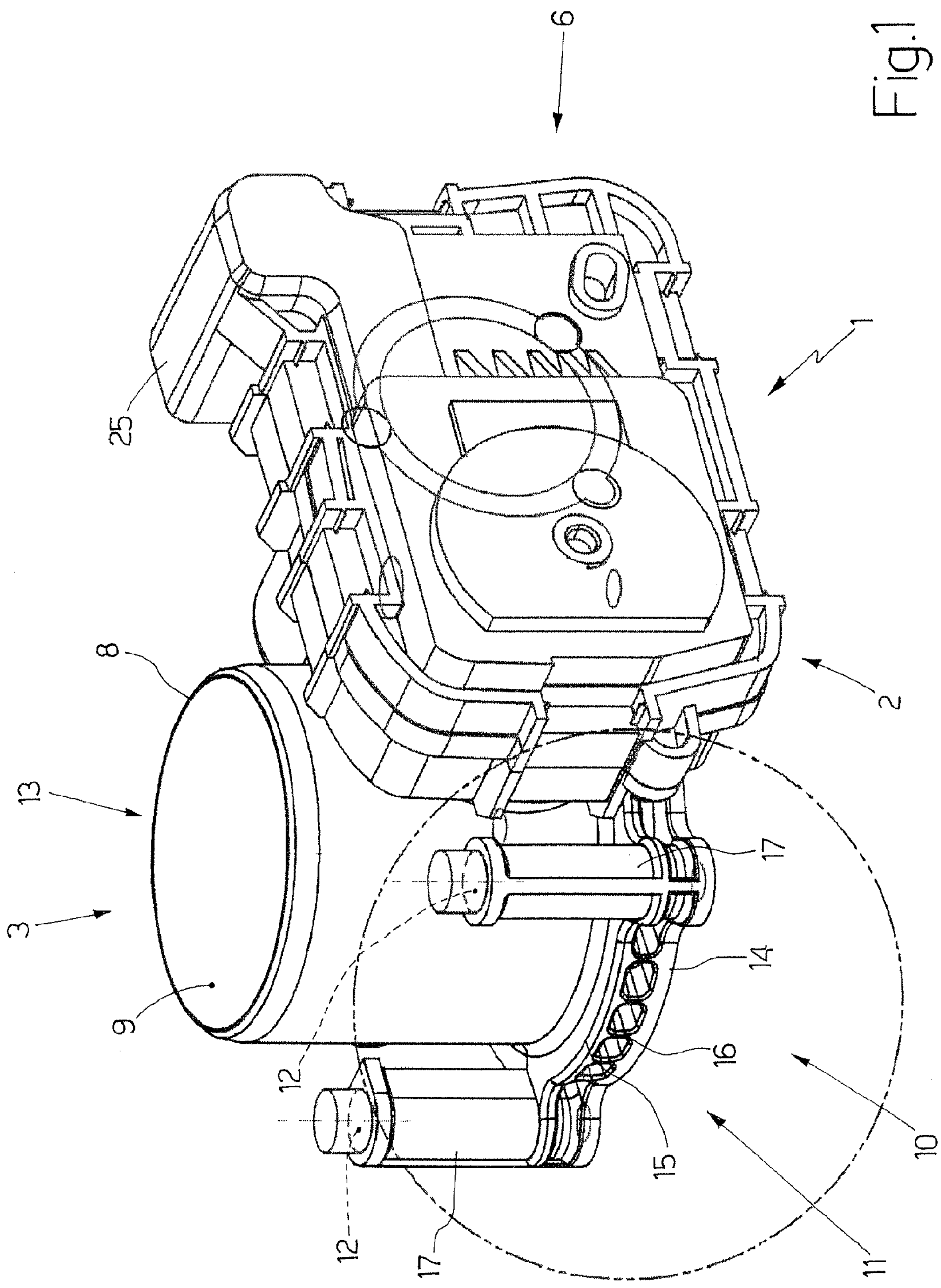
FIG. 1 is a perspective and diagrammatic view of a butterfly valve made according to the present invention.
Figure 3:
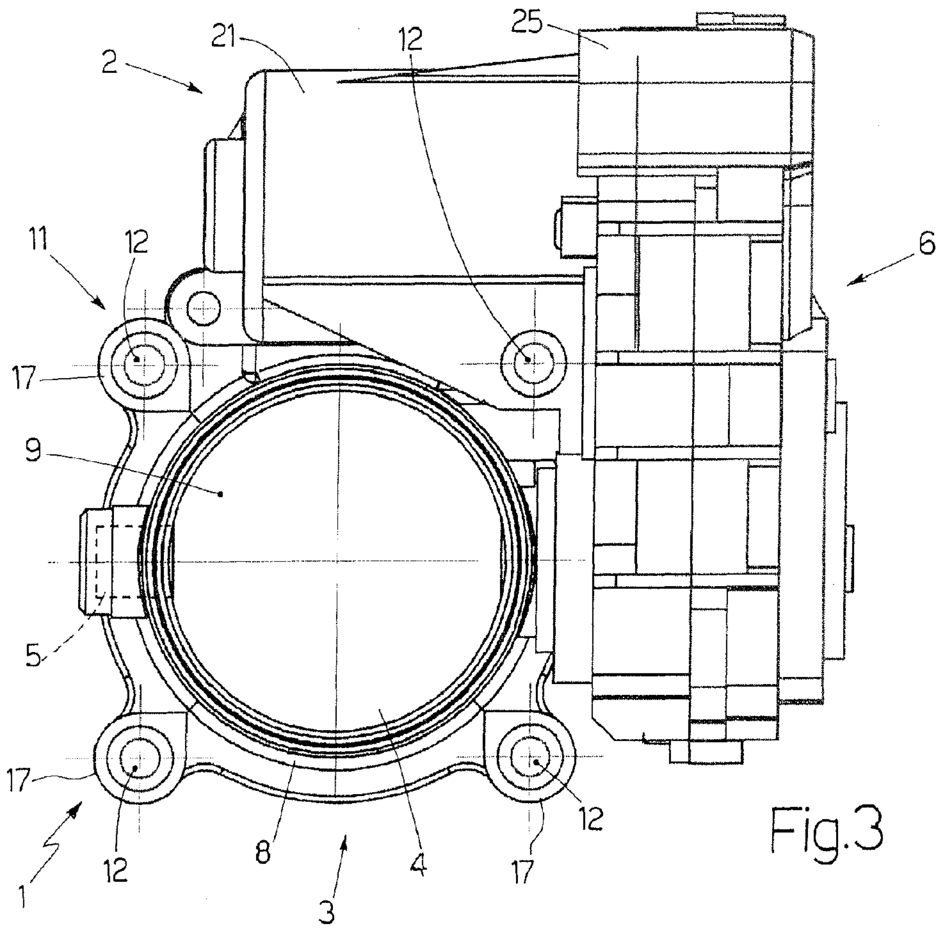
FIG. 3 is a plan view of the butterfly valve in FIG. 1.
Figure 4:
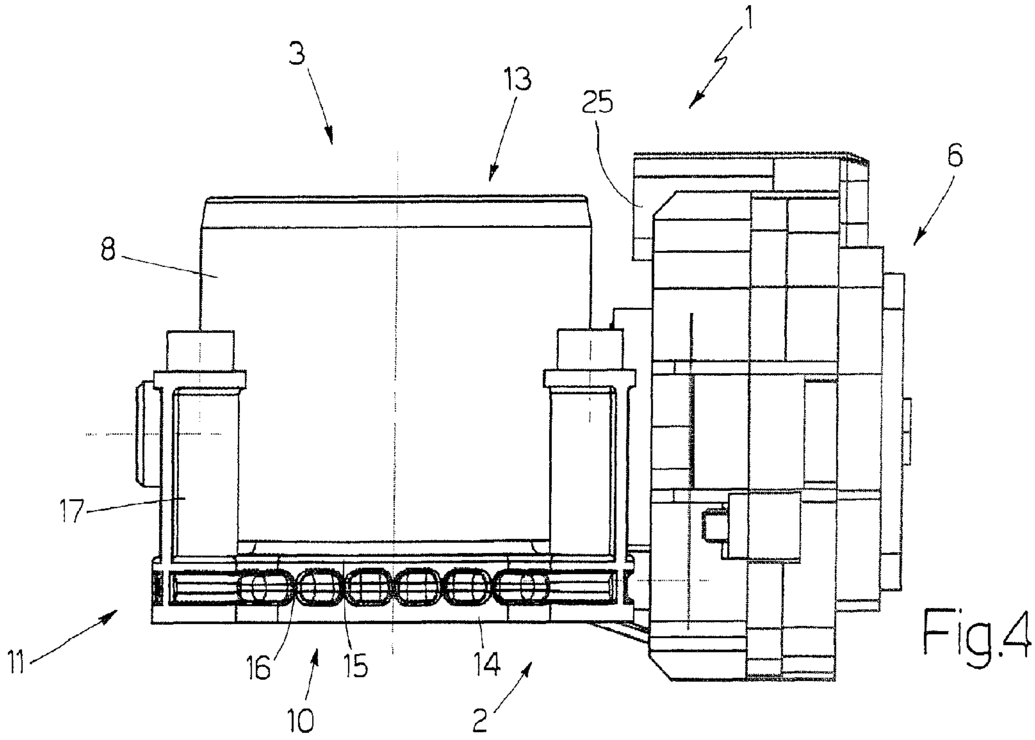
FIG. 4 is a side view of the butterfly valve in FIG. 1.
Figure 6:
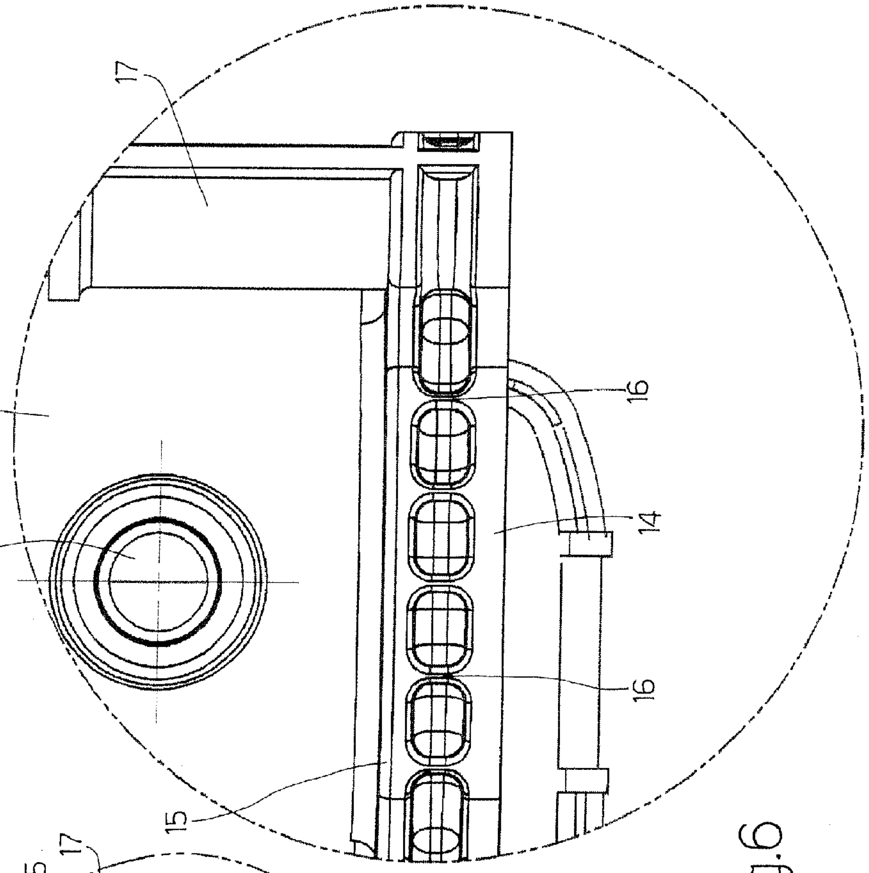
FIG. 6 is an enlarged view of a detail in FIG. 5.

In FIG. 1, numeral 1 indicates as a whole an electronically controlled butterfly valve for an internal combustion engine (not shown). Butterfly valve 1 comprises a valve body 2 formed by moulded plastic material (e.g. PPS—polyphenylene sulphide) and consisting of a valve module 3, in which there is obtained a valve seat engaged by a butterfly valve plate 4 (shown in FIG. 3) which is provided with a rotational shaft 5 (shown in FIG. 3) to rotate between an opening position and a closing position of the valve seat itself, and an actuation module 6, in which there is accommodated an actuation system 7 (shown in FIG. 7) to displace butterfly valve plate 4 from the opening position to the closing position of the valve seat.

Valve module 3 comprises a cylindrical tubular pipe 8, within which there is defined an air introduction channel 9 along which the valve seat is defined and butterfly valve plate 4 is thus arranged. At a first end 10 of cylindrical tubular pipe 8, there is provided a connection flange 11, which presents four through holes 12 which are crossed in use by corresponding fastening screws for rigidly fixing valve body 2 to an intake manifold (not shown) of the internal combustion engine. According to a different embodiment (not shown), there are contemplated only three through holes 12 reciprocally arranged at 120° instead of four through holes 12 reciprocally arranged at 90°.

When butterfly valve 1 is mounted in the internal combustion engine, about a second end 13 of cylindrical tube pipe 8 opposite to first end 10 there is fitted a flexible tube (not shown), which receives fresh air (i.e. air from the atmosphere) from an air vent (not shown) provided with an air cleaner and is fixed about second end 10 of cylindrical tubular pipe 8 by means of a tube clamp (not shown).

Figure 2:
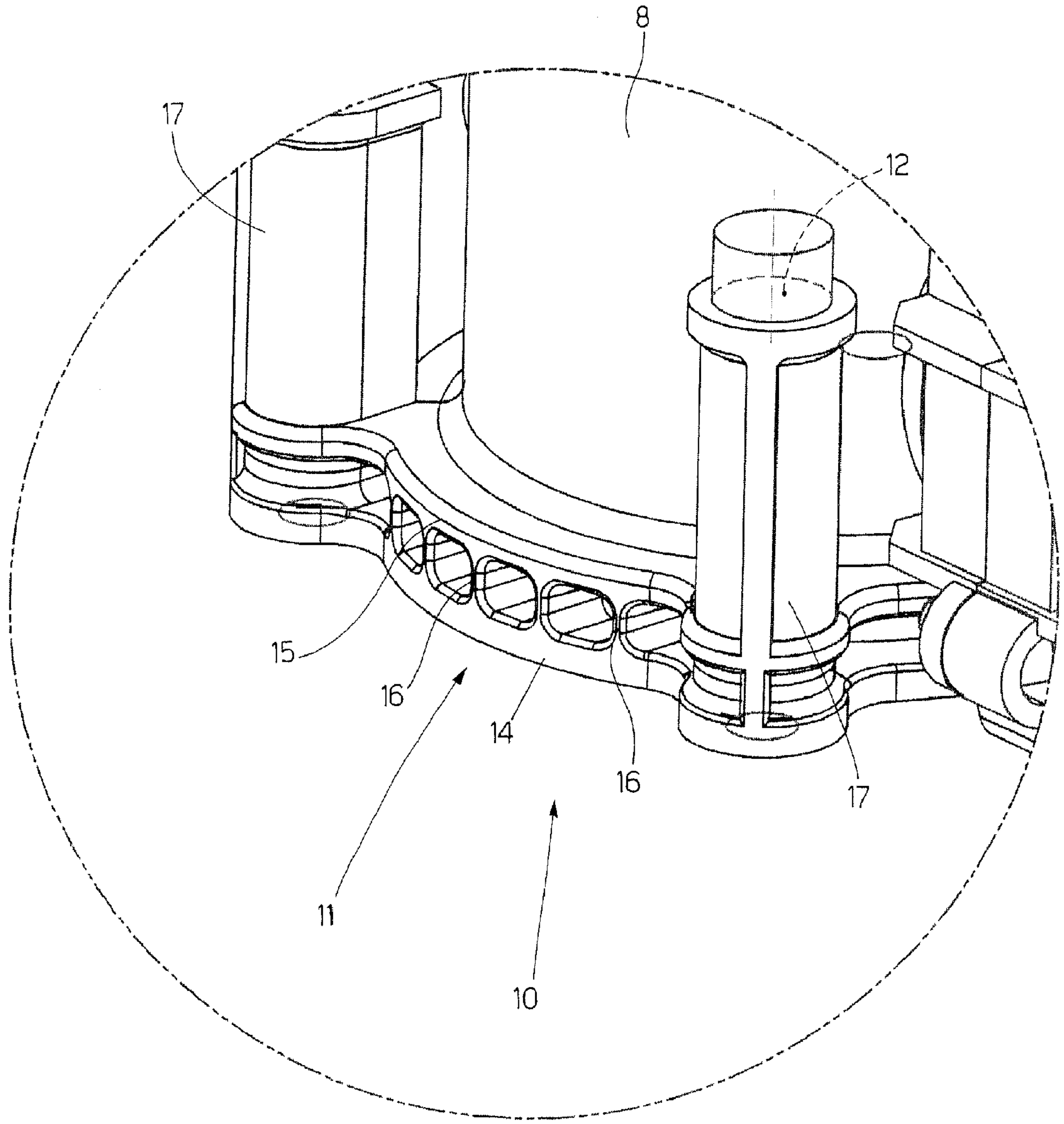
FIG. 2 is an enlarged view of a detail in FIG. 1.

As shown in greater detail in FIG. 2, connection flange 11 comprises a lower annular plate 14 and an upper annular plate 15, which are reciprocally parallel, facing, distanced and radially arranged (i.e. perpendicularly to the central symmetry axis) with respect to cylindrical tubular pipe 8. Furthermore, connection flange 11 comprises a number of ribs 16, which reciprocally connect plates 14 and 15, are arranged perpendicularly to plates 14 and 15, and are arranged axially (i.e. parallelly to the central symmetry axis) with respect to cylindrical tubular pipe 8. According to a preferred embodiment, the thickness of each rib 16 is equal to approximately 0.6 times (indicatively 0.55-0.65 times) the thickness of each plate 14 or 15; in this manner, the best relation between overall mechanical stiffness of connection flange 11 and amount of material used is obtained.

Indicatively, the overall height of connection flange 11 (i.e. the distance between the lower surface of lower plate 14 and the upper surface of upper surface 15) is between 10 and 20 mm, the thickness of plates 14 and 15 is approximately 2.5 mm and the thickness of ribs 16 is approximately 1.5 mm.

According to the embodiment shown in the accompanying figures, ribs 16 are shaped so as to present a variable thickness along their height and specifically a constant thickness at a central portion and a thickness which increases according to a circular profile towards plates 14 and 15.

According to a preferred embodiment, at each hole 12, connection flange 11 comprises a reinforcement column 17, which is centrally perforated to accommodate a corresponding fastening screw. According to the illustrated embodiment, reinforcement columns 17 elevate perpendicularly from connection flange 11 and externally to connection flange 11 itself; according to a different embodiment (not shown), reinforcement columns 17 are confined within connection flange 11, i.e. extend only from lower plate 14 to upper plate 15. It is important to observe that each reinforcement column 17 originates exclusively from connection flange 11 and does not present any connection point with cylindrical tubular pipe 8; in other words, the external surface of each reinforcement column 17 always presents a non-null minimum distance from the external surface of cylindrical tubular pipe 8.

Figure 7:
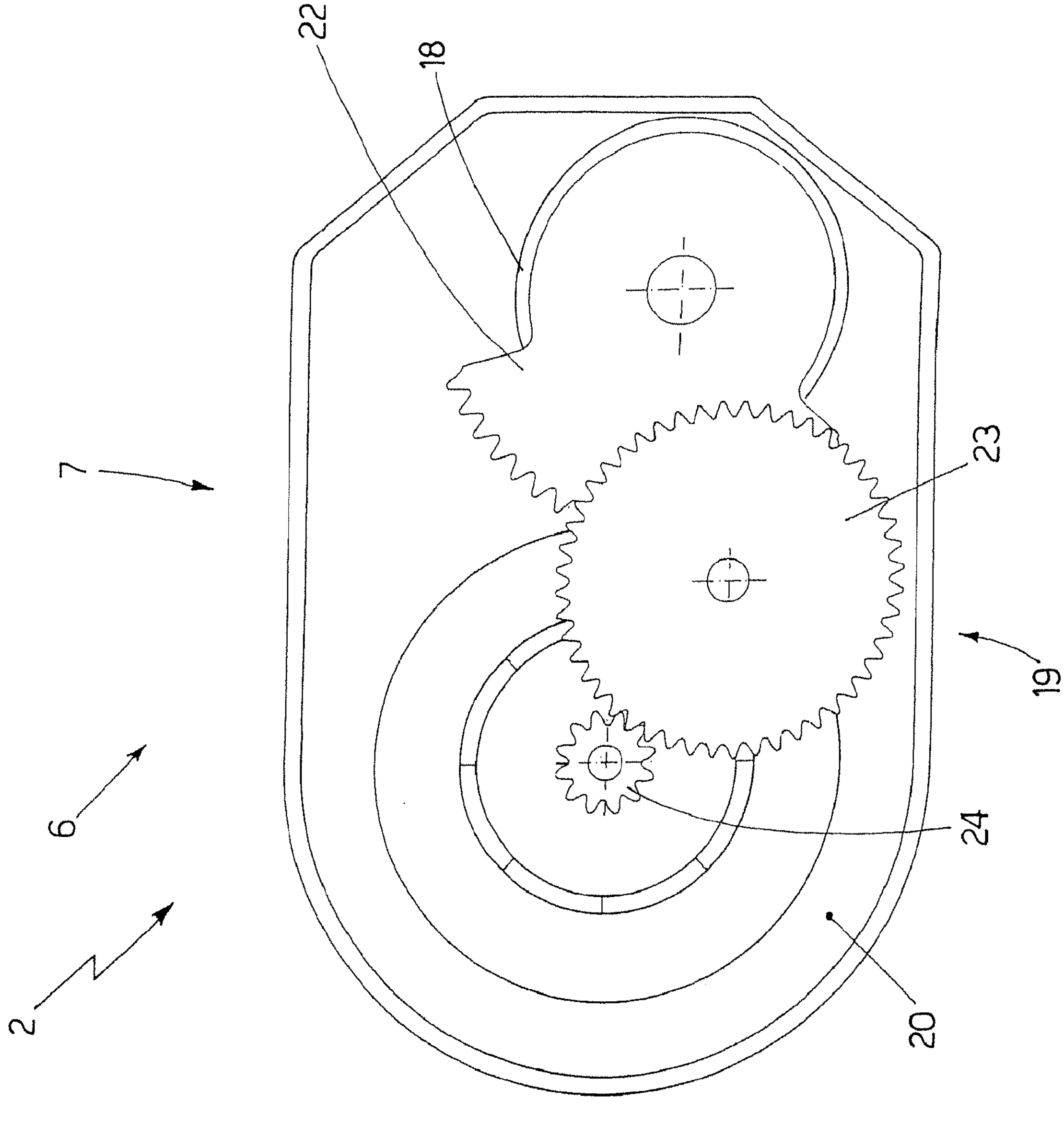
FIG. 7 is a front view of an accommodation chamber of an actuation module of the butterfly valve in FIG. 1.

As shown in FIG. 7, actuation system 7 comprises an electrical motor 18, which transmits the motion from shaft 5 of butterfly valve plate 4 by means of a geared drive 19 having a demultiplying effect (i.e. reducing the angular speed and increasing the motive torque). Actuation module 6 of valve body 2 presents a chamber 20, which is closed by a removable lid and accommodates both electrical motor 18 and geared drive 19.

Electrical motor 18 presents a cylindrical shape and is arranged in a tubular housing 21, which extends within chamber 20 and is arranged by the side of tubular pipe 8.

Geared drive 19 comprises a toothed wheel 22, which is integral with a rotor of electrical motor 18 and meshes with an internal toothed ring gear (not shown) of an idle toothed wheel 23; an idle external toothed ring gear 24 meshes with a further toothed wheel 25 integral with shaft 5 of butterfly valve plate 4.

A position sensor, which is adapted to detect the angular position of shaft 5 (i.e. of butterfly valve plate 4), is coupled to one end of shaft 5 arranged within chamber 20 (i.e. at toothed wheel 24) to allow a control unit to feedback-control electrical motor 18 (i.e. to allow a feedback control of the position of butterfly valve plate 4).

According to a preferred embodiment, actuation module 6 and valve 3 are made independently with respect to each other and are joined together to form valve body 2. As previously mentioned, actuation module 6 supports actuation system 7 (i.e. electrical motor 18, geared drive 19 and the sensor) and comprises accommodation chamber 20 and the corresponding lid; instead, valve module 3 supports the valve seat, butterfly valve plate 4 and shaft 5, and comprises tubular pipe 8.

Actuation module 6 may be mechanically connected to valve module 3 by means of various types of mechanical interfaces; e.g. by means of mechanical fitting combined with screws, by means of mechanical fitting combined with adhesive or by means of non-reversible mechanical fitting (also called snap-fit). When actuation module 6 is mechanically connected to valve module 3, shaft 5 of butterfly valve plate 4 is keyed onto toothed wheel 24 (i.e. onto the terminal toothed wheel of geared drive 19) so as to connect shaft 5 itself to geared drive 19; for this purpose, toothed wheel 24 preferably presents a seat for engaging shaft 5 of butterfly valve plate 4.

It is important to underline that valve module 3 presents a symmetric mass distribution and it is thus possible to make valve module 3 formed by moulded plastic material obtaining without particular devices (i.e. cost-effectively) a high manufacturing precision (specifically a high circularity of the tubular pipe 8) because the inevitable shrinkage of the plastic material during solidification will be symmetric. Actuation module 6 also presents a rather symmetric mass distribution and it is thus possible to form valve module 3 by moulded plastic material obtaining a good manufacturing precision without particular devices (i.e. cost-effectively).

By making actuation module 6 separate from valve module 3, it is apparent that any same actuation module 6 may be coupled to different valve modules 3 (or vice versa) allowing to advantageously obtain economies of scale; typically, any same actuation module 6 is coupled to valve modules 3 of different dimensions so as to obtain a series of butterfly valves 1 suitable to be mounted in various types of internal combustion engines.

Figure 5:
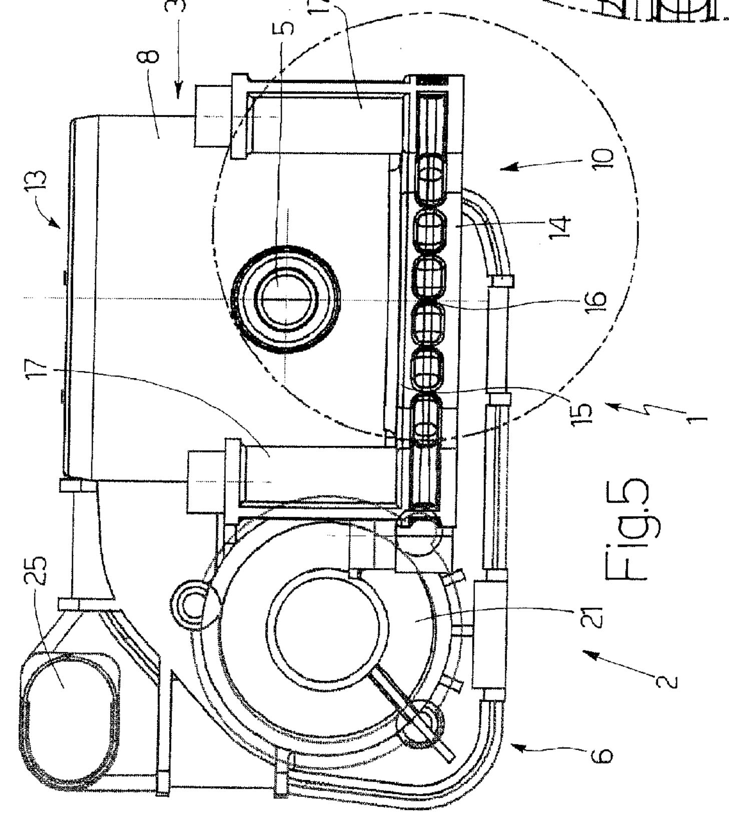
FIG. 5 is a rear view of the butterfly valve in FIG. 1.

As shown in FIG. 5, actuation module 6 of butterfly valve 1 comprises an electrical connector 25, which is electrically connected both to electrical motor 18 and to the position sensor, and is used to connect actuation module 6 to an electronic control unit adapted to drive the electrical motor 18 according to a feedback control logic using the angular position of butterfly valve plate 4 as feedback magnitude.

The above-described butterfly valve 1 is simple and cost-effective to manufacture and at the same time allows to obtain a high manufacturing precision of tubular pipe 8 and thus of air introduction channel 9 in which the valve seat is obtained and butterfly plate 4 is accommodated. Such result is obtained in virtue of the fact that reinforcement columns 17 do not present any connection points to tubular pipe 8 and consequently do not determine local deformations of tubular pipe 8 itself during the step of moulding.

Furthermore, despite the absence of contact points between reinforcement columns 17 and tubular pipe 8, connection flange 11 presents a high mechanical strength (specifically, a high rigidity) also when valve body 2 is formed by moulded plastic material. Such result is obtained in virtue of the particular conformation of connection flange 11 which contemplates the presence of two reciprocally parallel plates 14 and 15, distanced and connected together by a series of ribs 16.

In virtue of the many presented advantages, the structure of the above-described butterfly valve 1 may be re-employed to manufacture other types of valves for adjusting the air flow rate in an internal combustion engine; e.g. such structure may be re-employed to make an interception valve of an exhaust gas recirculation circuit (also called "EGR valve"). Obviously, rotational butterfly valve 4 may be replaced by a similar mobile shutter with rotary movement or with translating movement.

The invention claimed is:

1. A valve (1) for adjusting the air flow rate in an internal combustion engine; the valve (1) comprises:

a valve body (2);

a cylindrical tubular pipe (8) obtained within the valve body (2) and in which an air introduction channel (9) is defined;

a valve seat obtained along the air introduction channel (9) of the tubular pipe (8);

an actuation system (7);

a shutter, which engages the valve seat and is mobile between an opening position and a closing position of the valve seat under the bias of the actuation system (7); and a connection flange (11), which is integral with a first end (10) of the tubular pipe (8) and presents a plurality of through holes (12) which are crossed in use by corresponding fastening screws for rigidly fixing the valve body (2);

the valve (1) is characterised in that the connection flange (11) comprises:

a lower plate (14) and an upper plate (15), which are reciprocally parallel, facing and distanced and are arranged radially with respect to the cylindrical tubular pipe (8); and a number of ribs (16), which reciprocally connect the plates (14, 15), are arranged perpendicularly to the plates (14, 15), and are arranged axially with respect to the cylindrical tubular pipe (8).

2. A valve (1) according to claim 1, wherein the thickness of each rib (16) is equal to approximately 0.6 times the thickness of each plate (14, 15).

3. A valve (1) according to claim 1, wherein, at each hole (12), the connection flange (11) comprises a reinforcement column (17), which is centrally perforated to accommodate a corresponding fastening screw.

4. A valve (1) according to claim 3, wherein the reinforcement columns (17) elevate perpendicularly to the connection flange (11) and externally to the connection flange (11) itself.

5. A valve (1) according to claim 3, wherein the reinforcement columns (17) are confined within the connection flange (11).

6. A valve (1) according to claim 3, wherein each reinforcement column exclusively originates from the connection flange (11) and does not present any connection point with the tubular pipe (8).

7. A valve (1) according to claim 1, wherein the valve body (2) is formed by moulded plastic material.

8. A valve (1) according to claim 1, wherein the shutter is defined by a butterfly valve plate (4) provided with a rotational shaft (5) to rotate between the opening position and the closing position of the valve seat; the actuation system (7) comprises an electrical motor (18) and a geared drive (19) to transmit the motion from the electrical motor (18) to the shaft (5) of the butterfly valve plate (4).

9. A valve (1) according to claim 8, wherein the geared drive (19) comprises a first toothed gear (22), which is integral with the shaft of the electrical motor (18) and meshes with an idle external ring gear of a second idle toothed wheel (23); an external ring gear of the second idle toothed wheel (23) meshes with a third toothed wheel (24) integral with the shaft (5) of the butterfly valve plate (5).

10. A valve (1) according to claim 8, wherein in the valve body (2), there is obtained an accommodation chamber (20), which accommodates the electrical motor (18) and the geared drive (19) and is sealed by a removable lid.

11. A valve (1) according to claim 10, wherein the valve body (2) consists of an actuation module (6) and a valve module (3), which are made independently with respect to each other and joined together; the actuation module (6) comprises the accommodation chamber (20); the valve module (3) supports the valve seat, the butterfly valve plate (4) and the shaft (5) and comprises the tubular pipe (8).

12. A valve (1) according to claim 1, wherein the actuation system (7) comprises a position sensor, which is adapted to detect the angular position of the shaft (5) of the butterfly valve plate (4) to allow a feedback control of the position of the butterfly valve plate (4).

* * * * *